(12) United States Patent
Manske

(10) Patent No.: US 8,531,295 B2
(45) Date of Patent: Sep. 10, 2013

(54) SECURITY SYSTEM FOR SALES DEVICE

(75) Inventor: Jürgen Manske, Borchen (DE)

(73) Assignee: Wincor Nixdorf International GmbH (DE)

( * ) Notice: Subject to any disclaimer, the term of this patent is extended or adjusted under 35 U.S.C. 154(b) by 173 days.

(21) Appl. No.: 13/002,102

(22) PCT Filed: Jul. 13, 2009

(86) PCT No.: PCT/EP2009/058889
§ 371 (c)(1),
(2), (4) Date: Mar. 29, 2011

(87) PCT Pub. No.: WO2010/007012
PCT Pub. Date: Jan. 21, 2010

(65) Prior Publication Data
US 2011/0169639 A1     Jul. 14, 2011

(30) Foreign Application Priority Data

Jul. 14, 2008  (DE) .......................... 10 2008 032 872

(51) Int. Cl.
*G08B 13/14*     (2006.01)
(52) U.S. Cl.
USPC ..................................... 340/568.1; 340/568.5
(58) Field of Classification Search
USPC .......................................... 340/568.1, 568.5
See application file for complete search history.

(56) References Cited

U.S. PATENT DOCUMENTS

| 5,013,896 A | 5/1991 | Ono et al. | |
| 6,771,981 B1 | 8/2004 | Zalewski et al. | |
| 7,920,063 B2 * | 4/2011 | Ulrich | 340/572.1 |
| 2006/0043175 A1 * | 3/2006 | Fu et al. | 235/383 |
| 2006/0282332 A1 | 12/2006 | Pfleging et al. | |
| 2008/0001747 A1 * | 1/2008 | Kangas | 340/572.1 |
| 2008/0065546 A1 * | 3/2008 | Ramachandran | 705/44 |
| 2009/0045955 A1 * | 2/2009 | Ulrich | 340/572.1 |

FOREIGN PATENT DOCUMENTS

| CA | 2506121 A1 | 4/1997 |
| DE | 202004020790 | 2/2006 |
| GB | 2410356 | 7/2005 |
| GB | 2410356 A | 7/2005 |

(Continued)

OTHER PUBLICATIONS

Translation of International Preliminary Report on Patentability for PCT/EP2009/058889 (Feb. 10, 2011).

*Primary Examiner* — Travis Hunnings
(74) *Attorney, Agent, or Firm* — Harness, Dickey & Pierce, P.L.C.

(57) ABSTRACT

A security system (SYS) is proposed for a sales facility having at least one first equipment (CP) for issuing a proof of payment for articles and/or services purchased and having at least one second equipment (CTR) for inspecting the proof of purchase, where the first equipment (CP) generates an electronic proof of payment in the form of an identifier (CD) and has a transmitting device (CP-S) that send the identifier wirelessly to a mobile device (M), and the second equipment (CTR) has at least one receiving device (CTR-R) that receives the identifier (CD) wirelessly from the mobile device (M). The first equipment can be a register system (CP), specifically a self-service register system and/or pay station. The second equipment (CTR) can be a control system that can be installed in the exit area of the sales facility, specifically a control gate system (CTR).

24 Claims, 3 Drawing Sheets

(56) References Cited

FOREIGN PATENT DOCUMENTS

| GB | 2423853 | 9/2006 |
| GB | 2423853 A | * 9/2006 |
| GB | 2423853 A | 9/2006 |
| WO | WO-98/44462 A2 | 10/1998 |

* cited by examiner

SECURITY SYSTEM FOR SALES DEVICE

CROSS-REFERENCE TO RELATED APPLICATION

This application is a National Stage of International Application No. PCT/EP2009/058889, filed Jul. 13, 2009. This application claims the benefit and priority of German application 10 2008 032 872.3 filed Jul. 14, 2008. The entire disclosures of the above applications are incorporated herein by reference.

BACKGROUND

This section provides background information related to the present disclosure which is not necessarily prior art.

1. Technical Field

The invention relates to a security system for a sales facility and a mobile device used therein, a method carried out by said device and the use of the security system.

2. Discussion

The invention relates in particular to a security system for sales facilities, such as retail stores and branches that are equipped with self-service systems, self-service registers and/or self-service automats.

Sales facilities that specifically have self-service systems must be assured that the customers, or consumers, who purchase goods there and/or avail themselves of services can only leave the sales facility when proper payment has been made and said payment can also be verified. Normally, proof of payment is printed by the existing register system in the form of a register receipt which can be inspected manually by staff assigned to the task upon the customer leaving the sales facility, or can be inspected automatically by suitable control systems.

It is known to provide the register receipt with a barcode which can then be read by the control system or a scanner installed there and inspected. However, to do so requires that the customer or consumer shows the register receipt upon leaving the sales facility. However, if the register receipt should have become soiled, damaged or even been lost in the interim, this inspection is no longer possible.

SUMMARY OF THE INVENTION

It is, therefore, the object of the present invention to improve a security system of the type described initially in such a way that the disadvantages listed are eliminated in an advantageous manner. Specifically, even in the event of the loss, damage and/or soiling of any register receipts issued, secure and automatic inspection is to be possible.

Accordingly, it is proposed that the security system has first equipment that generates an electronic proof of payment in the form of an identifier, where the first equipment has a transmitting device that sends this identifier wirelessly to a mobile device, and that the security system has second equipment that has at least one receiving device that receives the identifier wirelessly from the mobile device.

Similarly, a mobile device is proposed that can be used in the security system, where the mobile device has at least the following components:

a receiving part to receive an electronic proof of payment wirelessly from the first equipment in the form of an identifier;

a memory to save the identifier received; and a transmitting part and/or a display unit to transmit the identifier or a visual representation thereof to the second equipment.

In addition, a method for securing a sales facility by means of a security system in which the following steps are performed before the actual inspection of the proof of payment:

an electronic proof of payment in the form of an identifier is generated by the first equipment;

the identifier is transmitted wirelessly by a transmitting device to a mobile device; and the identifier is received wirelessly from the mobile device by the second equipment by means of at least one receiving device.

Additionally, the use of such a security system is proposed, where said security system is employed specifically in a sales facility that is equipped as a shopping site that has self-service automats and/or self-service registers.

Accordingly, it is proposed here to develop a security system of the type described initially to the point that proofs of payment are generated in electronic form, namely as electronic identifiers and transmitted wirelessly and directly to a mobile device that the customer or consumer carries with him, where, to inspect the electronic proof of payment, second equipment is provided at the exit of the sales facility that has at least one receiving device that receives the electronic identifier wirelessly from the mobile device. Thus, the generation of a proof of payment and the transmission of said proof of payment for inspection can be carried out entirely electronically, wherein the invention takes advantage in particular of the use of mobile wireless devices known as PDAs (personal digital assistant) and/or portable computers. In this, the wireless transmission of the proof of payment can be accomplished specifically by the following forms of data transmission: optical data transmission, particularly infra-red data transmission and/or barcode scanning; inductive data transmission; microwave data transmission, in particular near-field communications; radio data transmission, in particular Bluetooth data transmission.

Preferably provision can be made for the electronic identifier generated to have a time stamp that indicates a maximum period when this identifier is valid. It is also advantageous if provision is made for the electronic identifier generated to have a frequency stamp that indicates a maximum number of repeat uses. In this way, potential attempts at abuse can be prevented or rendered considerably more difficult.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
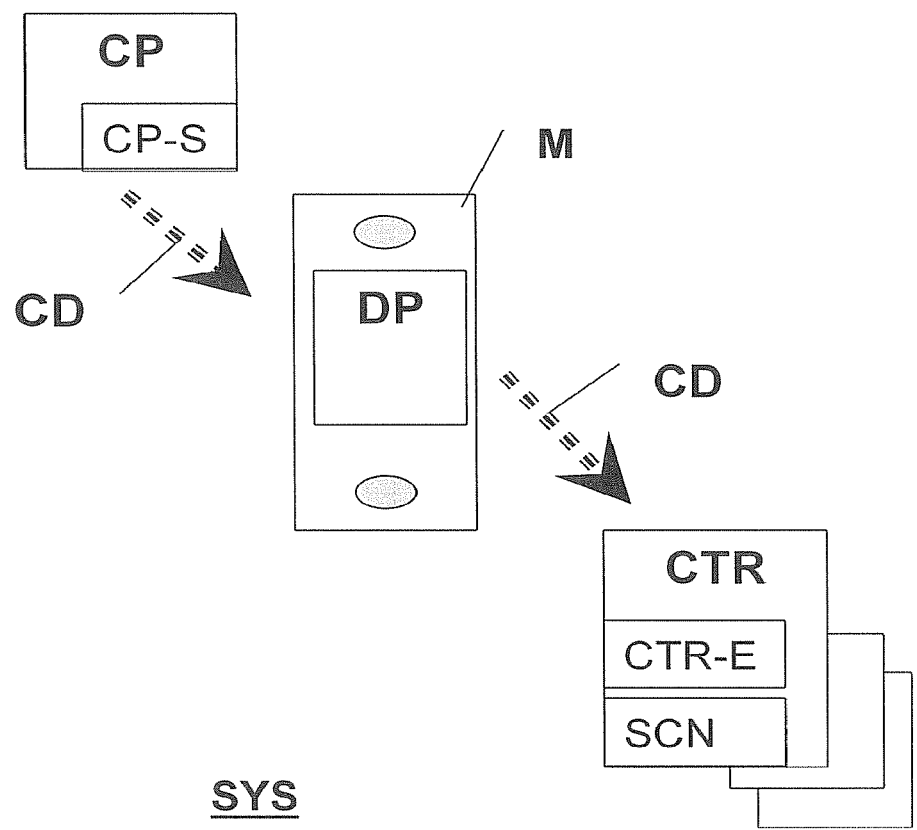
FIG. 1 shows the schematic structure of the security system in accordance with the invention.

As shown in FIG. 1, the security system SYS in accordance with the invention comprises first equipment CP that can be implemented as a register system or register pay stations. The system SYS further comprises at least second equipment CTR that is installed in the exit area of the sales facility and is organized as a control door system for example. Mobile devices are employed in the security system SYS to transmit the electronically generated proofs of payment CD, where in FIG. 1 a mobile device M is shown in the form of a mobile telephone as an example.

In order to communicate with the mobile device M, the first equipment CP has a transmitting device CP-S. The second equipment CTR has a receiving device CTR-E and/or an image scanning device, or scanner, SCN. The mobile device M has corresponding interfaces for wireless transmission or communication with the first and the second equipment.

Figure 2:
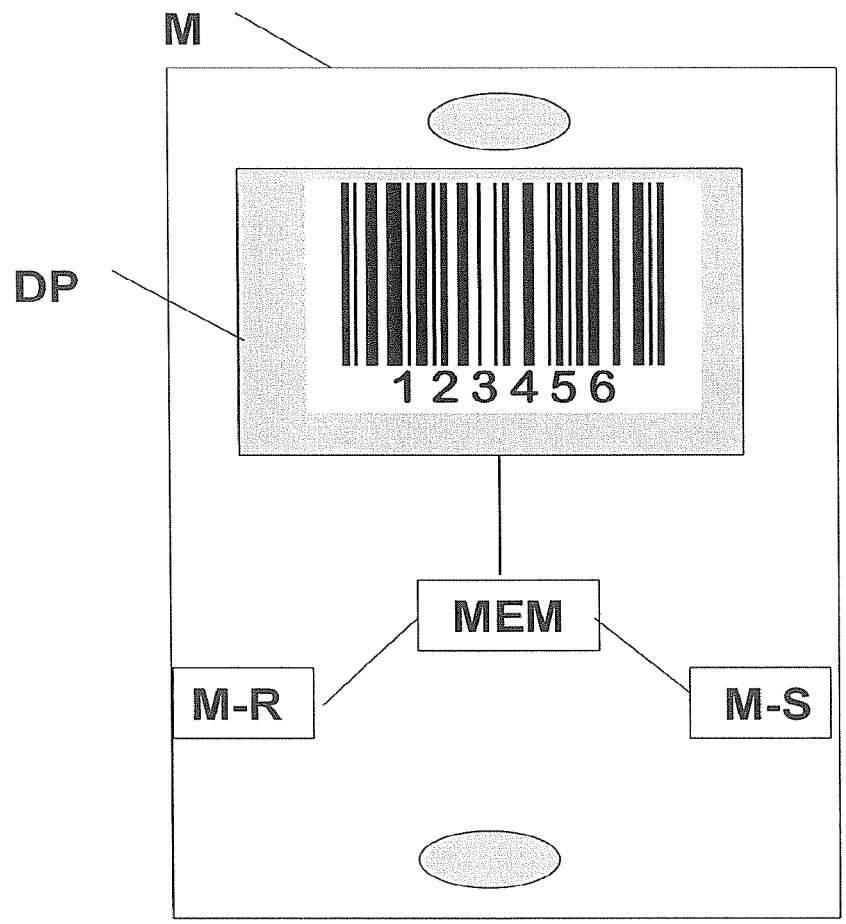
FIG. 2 shows the schematic structure of a mobile telephone that can be used in the security system.

As shown in FIG. 2, the mobile device M can be configured as a mobile telephone, for example, that specifically has a receiving part M-R, a memory device MEM and a transmitting part R-S. In addition, the mobile telephone may have a display DP that is capable of showing the electronic identifier or the proof of payment CD in a visual representation, specifically as a barcode.

In addition, the mobile device can be configured as loan equipment, i.e. a mobile device made available to the customers in the sales facility on a loan basis. In this respect, provision can be made to attach the mobile device to a shopping cart or shopping basket used by the customers in the sales facility or to integrate said device therein. In this way, a shopping cart or basket thus equipped corresponds to a mobile device in the sense of the invention.

Figure 3:
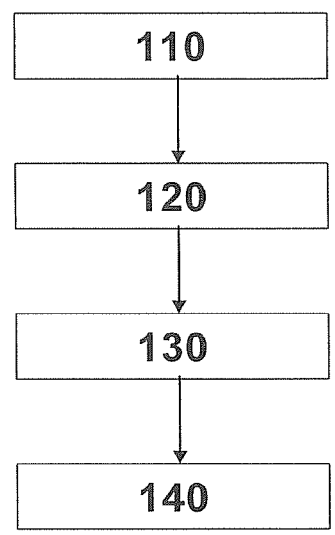
FIG. 3 shows the flow chart for a method in accordance with the invention.

The system SYS shown in FIG. 1 and the mobile device M shown in FIG. 2 function in accordance with the method 100 from FIG. 3. In a first step, an electronic proof of payment in the form of an identifier is generated by the first equipment, which represents a register system CP for example. In a next step 120, this identifier CD is transmitted wirelessly to the mobile device M. This transmission is made over near field communication NFC, for example, when the transmitted identifier CD is then filed in the mobile device M or in the memory MEM present there.

When leaving the sales facility, the customer or consumer with his mobile device approaches the control system installed there, i.e. the second equipment CTR, which then receives in step 130 the electronic identifier CD from the mobile device. Here, for example, a transmission can also be made via near field communication. To do this, the second equipment CTR has a corresponding receiving part CTR-E.

Provision can also be made for the electronic identifier CD to be processed by the mobile device M into a visual representation in the form of a barcode and shown on the display DP. Then provision can be made in step 130 for the second equipment CTR to scan or read the barcode displayed by means of a scanner SCN, which is the equivalent of a wireless transmission of the electronic identifier CD.

As soon as the electronic identifier CD has been received by the second equipment CTR, the identifier CD can be checked in a subsequent step 140 for its validity. Provision can also be made here for a maximum period of validity or usable life to be indicated for the code in the form of a time stamp. If the period of validity has been exceeded, the identifier or the proof of payment is rejected as invalid. The customer is then barred from leaving the sales facility. Provision can similarly be made for a check to be made whether the particular electronic identifier CD has already been used several times. Using a frequency stamp, a check is made whether a maximum permissible number of repeat uses has been exceeded. If this is the case, the identifier CD is rejected as invalid in this situation as well, and the customer is barred from leaving the sales facility.

The invention is thus particularly suitable for checking authorized exit from a sales facility within a gate of a self-checkout system. With the previous systems, it was necessary for the customer to receive a register receipt after paying and he had to hold said receipt in front of a barcode reader, whereupon the door or the barrier opened. This cumbersome procedure can be considerably simplified by the present invention. Since an electronic identifier or a security code is generated by the invention and transmitted to a mobile device, the correct payment can be documented completely electronically and be made available for automated inspection when leaving the sales facility. Errors in the case of loss or soiling of the receipt can thereby be prevented.

Through a networked development of the proposed system in which additional systems used in the outlet or sales facility are integrated, the electronic identifiers or security codes generated are available immediately both at the manned or unmanned register system on the one hand and at the control gates installed at the exits on the other. The system can also be designed such that when passing control gates security codes used once immediately lose their validity. It is then ensured over the networked security system that this invalid security code or the identifier is no longer usable at any additional control gates.

The method proposed here can specifically proceed as follows:

The customer or consumer makes his purchase, registers and pays for the selected articles. After successfully completing the payment, which can be in cash or cashless, the register receipt is printed as required that documents ownership of the article and the payment made. Instead of the printed register receipt, or in addition thereto, under the invention an electronic proof of payment is generated and transmitted wirelessly to the mobile device or mobile telephone carried by the customer. Said transmission can be handled over already existing radio or infra-red interfaces and similar.

The electronic identifier generated thus corresponds to an electronic receipt number that is saved at least temporarily in the mobile telephone. An application is preferably stored in the mobile telephone that is capable of processing the electronic identifier generated or receipt number and showing it as a visual barcode on the display of the mobile telephone. When the customer leaves the sales facility, the electronic identifier is transmitted to the second equipment in order to pass through the control gate. This transmission can take place over a radio interface or the like. Alternatively, or in addition, the transmission can be made in the form of a visual barcode that is read by the control gate by means of a scanning device.

The electronically generated identifier or the barcode derived therefrom is now compared with stored data in order to determine whether the payment for the articles has been made properly. If the inspection is concluded in a positive manner, the gate opens and the consumer can leave the sales facility. The electronic identifier is then preferably canceled so that it cannot be used a second time.

In addition, provision can be made for the particular identifier that was generated or the security code to have a specifiable period of validity and/or a maximum re-use rate.

The invention proposed here is particularly suitable for use in those sales facilities that have self-service automats and/or self-service registers.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A security system (SYS) for a sales facility having at least one first equipment (CP) to issue a proof of payment for items and/or services purchased and having at least one second equipment (CTR) for inspecting the proof of payment, wherein the first equipment (CP) generates an electronic proof of payment in the form of an identifier (CD) and has a transmitting device (CP-S) that sends the identifier (CD) wirelessly to a mobile device (M), wherein the second equipment (CTR) has a receiving device (CTR-R) that receives the identifier (CD) wirelessly from the mobile device (M) and an optical image scanning device (SCN);
   wherein the first equipment is a register system (CP);
   wherein the second equipment (CTR) is a control system installed in an exit area of the sales facility;
   wherein the transmitting device (CP-S) and the receiving device (CTR-R) both perform wireless data transmissions including at least one of near field communication and Bluetooth data transmission; and
   wherein the optical image scanning device (SCN) performs optical data transmission including barcode scanning.

2. The security system (SYS) from claim 1, wherein the first equipment is a self-service register system and/or pay station.

3. The security system (SYS) from claim 1, wherein the second equipment is a control gate system (CTR).

4. The security system (SYS) from claim 1, wherein the transmitting device (CP-S) and/or the receiving device (CTR-R) perform infra-red data transmission.

5. The security system (SYS) from claim 1, wherein the first equipment (CP) generates the identifier in the form of a barcode (CD) that can be shown on a display (DP) of the mobile device (M).

6. The security system (SYS) from claim 5, wherein the optical image scanning device (SCN) scans the barcode shown on the display (DP) of the mobile device (M).

7. The security system (SYS) from claim 1, wherein the first equipment (CP) assigns a time stamp to the identifier generated that indicates a maximum validity period for the identifier (CD).

8. The security system (SYS) from claim 7, wherein the second equipment (CTR) inspects the time stamp and rejects the identifier (CD) as invalid when the maximum validity period has been exceeded.

9. The security system (SYS) from claim 1, wherein the second equipment (CTR) assigns a frequency stamp to the identifier generated (CD) that indicates a maximum number for repeat uses of the identifier (CD).

10. The security system (SYS) from claim 9, wherein the second equipment (CTR) detects repeated uses of the identifier (CD) and rejects the identifier (CD) as invalid when the maximum number of repeat uses has been exceeded.

11. A mobile device (M) for a security system (SYS) in a sales facility that has at least one first equipment (CP) to issue a proof of payment for articles and/or services purchased and at least one second equipment (CTR) for inspecting the proof of payment, wherein the mobile device (M) comprises:
   a receiving part (M-R) to receive an electronic proof of payment in the form of an identifier (CD) wirelessly from the first equipment (CP);
   a transmitting part (M-S) to transmit the identifier (CD) wirelessly to the second equipment (CTR); and
   a display unit (DP) to optically display the identifier (CD);
   wherein the first equipment is a register system (CP);
   wherein the second equipment (CTR) is a control system that can be installed in an exit area of the sales facility;
   wherein the receiving part (M-R) and the transmitting part (M-S) of the mobile device (M) both perform wireless data transmissions including at least one of near field communication and Bluetooth data transmission; and
   wherein the display unit (DP) displays the identifier in the form of a barcode (CD) to be read by the control system.

12. The mobile device from claim 11, wherein the receiving part (M-R) and the transmitting part (M-S) of the mobile device (M) perform at least one of the following wireless data transmissions:
   infra-red data transmission; and
   inductive data transmission.

13. The mobile device (M) from claim 11, wherein the mobile device is a mobile radio terminal, a personal digital assistant or a portable computer.

14. The mobile device (M) from claim 11, wherein the mobile device is a mobile device provided on loan to customers in the sales facility.

15. The mobile device (M) from claim 14, wherein the mobile device is attached to a shopping cart or basket used by the customers in the sales facility.

16. A method to secure a sales facility by means of a security system (SYS), wherein a proof of payment for articles and/or services purchased is issued by first equipment (CP) and the proof of payment is inspected by at least one second equipment (CTR), comprising the following steps before the inspection of the proof of payment:
   an electronic proof of payment is generated by the first equipment (CP) in the form of an identifier (CD); the identifier (CD) is sent wirelessly by a transmitting device (CP-S) to a mobile device (M); the identifier (CD) is received wirelessly by the second equipment (CTR) from the mobile device (M) by means of at least one of a receiving device (CTR-R) and an optical image scanning device (SCN);
   wherein the first equipment is a register system (CP);
   wherein the second equipment (CTR) is a control system that can be installed in an exit area of the sales facility;
   wherein the transmitting device (CP-S) and the receiving device (CTR-R) both perform wireless data transmissions including at least one of near field communication and Bluetooth data transmission; and
   wherein the optical image scanning device (SCN) performs optical data transmission including barcode scanning.

17. A use of a security system (SYS) for a sales facility having at least one first equipment (CP) for issuing a proof of payment for articles and/or services purchased and having at least one second equipment (CTR) for inspecting the proof of payment, wherein the first equipment (CP) generates an electronic proof of payment in the form of an identifier (CD) and a transmitting device (CP-S) that sends the identifier (CD) wirelessly to a mobile device (M), and wherein the second equipment has a receiving device (CTR-R) that receives the identifier (CD) wirelessly from the mobile device (M) and an optical image scanning device (SCN);
    wherein the first equipment is a register system (CP);
    wherein the second equipment (CTR) is a control system that can be installed in an exit area of the sales facility,
    wherein the transmitting device (CP-S) and the receiving device (CTR-R) both perform wireless data transmissions including at least one of near field communication and Bluetooth data transmission; and
    wherein the optical image scanning device (SCN) performs optical data transmission including barcode scanning.

18. The use from claim 17, wherein the security system (SYS) is used in a sales facility that is designed as a shopping location that has self-service automats and/or self-service registers.

19. A security system (SYS) for a sales facility having at least one first equipment (CP) to issue a proof of payment for items and/or services purchased and having at least one second equipment (CTR) for inspecting the proof of payment, wherein the first equipment (CP) generates an electronic proof of payment in the form of an identifier (CD) and has a transmitting device (CP-S) that sends the identifier (CD) wirelessly to a mobile device (M), wherein the second equipment (CTR) has a receiving device (CTR-R) that receives the identifier (CD) wirelessly from the mobile device (M) and an optical image scanning device (SCN);
    wherein the first equipment is a register system (CP);
    wherein the second equipment (CTR) is a control system that can be installed in an exit area of the sales facility;
    wherein the transmitting device (CP-S) and the receiving device (CTR-R) both perform wireless data transmissions including at least one of near field communication and Bluetooth data transmission;
    wherein the optical image scanning device (SCN) performs optical data transmission including barcode scanning; and
    wherein the first equipment (CP) assigns a time stamp to the identifier generated that indicates a maximum validity period for the identifier (CD).

20. A security system (SYS) for a sales facility having at least one first equipment (CP) to issue a proof of payment for items and/or services purchased and having at least one second equipment (CTR) for inspecting the proof of payment, wherein the first equipment (CP) generates an electronic proof of payment in the form of an identifier (CD) and has a transmitting device (CP-S) that sends the identifier (CD) wirelessly to a mobile device (M), wherein the second equipment (CTR) has a receiving device (CTR-R) that receives the identifier (CD) wirelessly from the mobile device (M) and an optical image scanning device (SCN);
    wherein the first equipment is a register system (CP);
    wherein the second equipment (CTR) is a control system that can be installed in an exit area of the sales facility;
    wherein the transmitting device (CP-S) and the receiving device (CTR-R) both perform wireless data transmissions including at least one of near field communication and Bluetooth data transmission;
    wherein the optical image scanning device (SCN) performs optical data transmission including barcode scanning;
    wherein the first equipment (CP) assigns a time stamp to the identifier generated that indicates a maximum validity period for the identifier (CD); and
    wherein the second equipment (CTR) assigns a frequency stamp to the identifier generated (CD) that indicates a maximum number of repeat uses of the identifier (CD).

21. A mobile device (M) for a security system (SYS) in a sales facility that has at least one first equipment (CP) to issue a proof of payment for articles and/or services purchased and at least one second equipment (CTR) for inspecting the proof of payment, the mobile device (M) comprising:
    a receiving part (M-R) to wirelessly receive an electronic proof of payment in the form of an identifier (CD) from the first equipment (CP);
    a transmitting part (M-S) to wirelessly transmit the identifier (CD) to the second equipment (CTR); and
    a display unit (DP) to optically display a visual representation of the identifier (CD);
    wherein the first equipment is a register system (CP);
    wherein the second equipment (CTR) is a control system that can be installed in an exit area of the sales facility;
    wherein the receiving part (M-R) and the transmitting part (M-S) of the mobile device (M) both perform wireless data transmissions including at least one of near field communication and Bluetooth data transmission;
    wherein the display unit (DP) performs optical display of the identifier in the form of a barcode to be read by the control system; and
    wherein the first equipment (CP) assigns a time stamp to the identifier generated that indicates a maximum validity period for the identifier (CD).

22. A mobile device (M) for a security system (SYS) in a sales facility that has at least one first equipment (CP) to issue a proof of payment for articles and/or services purchased and at least one second equipment (CTR) for inspecting the proof of payment, the mobile device (M) comprising:
    a receiving part (M-R) to receive an electronic proof of payment in the form of an identifier (CD) wirelessly from the first equipment (CP);
    a transmitting part (M-S) to wirelessly transmit the identifier (CD) wirelessly to the second equipment (CTR); and
    a display unit (DP) optically display a visual representation of the identifier (CD);
    wherein the first equipment is a register system (CP);
    wherein the second equipment (CTR) is a control system that can be installed in an exit area of the sales facility,
    wherein the receiving part (M-R) and the transmitting part (M-S) of the mobile device (M) both perform wireless data transmissions including at least one of near field communication and Bluetooth data transmission;
    wherein the display unit (DP) performs optical display of the identifier in the form of a barcode (CD) to be read by the control system;
    wherein the first equipment (CP) assigns a time stamp to the identifier generated that indicates a maximum validity period for the identifier (CD); and
    wherein the second equipment (CP) assigns a frequency stamp to the identifier (CD) that indicates a maximum number of repeat uses of the identifier (CD).

23. A method to secure a sales facility by means of a security system (SYS), wherein a proof of payment for articles and/or services purchased is issued by first equipment (CP) and the proof of payment is inspected by at least one second equipment (CTR), characterized by the following steps before the inspection of the proof of payment:
    an electronic proof of payment is generated by the first equipment (CP) in the form of an identifier (CD);
    the identifier (CD) is sent wirelessly by a transmitting device (CP-S) to a mobile device (M); and the identifier (CD) is received wirelessly by the second equipment (CTR) from the mobile device (M) by at least one of a receiving device (CTR-R) and an optical image scanning device (SCN);

wherein the first equipment is a register system (CP);

wherein the second equipment (CTR) is a control system that can be installed in an exit area of the sales facility;

wherein the transmitting device (CP-S) and the receiving device (CTR-R) both perform wireless data transmissions including at least one of near field communication and Bluetooth data transmission;

wherein the optical scanning device (SCN) performs optical data transmission including barcode scanning;

wherein the first equipment (CP) assigns a time stamp to the identifier generated that indicates a maximum validity period for the identifier (CD).

24. A method to secure a sales facility by means of a security system (SYS), wherein a proof of payment for articles and/or services purchased is issued by first equipment (CP) and the proof of payment is inspected by at least one second equipment (CTR), characterized by the following steps before the inspection of the proof of payment:

an electronic proof of payment is generated by the first equipment (CP) in the form of an identifier (CD);

the identifier (CD) is sent wirelessly by a transmitting device (CP-S) to a mobile device (M); and the identifier (CD) is received wirelessly by the second equipment (CTR) from the mobile device (M) by at least one of a receiving device (CTR-R) and an optical image scanning device (SCN);

wherein the first equipment is a register system (CP);

wherein the second equipment (CTR) is a control system that can be installed in an exit area of the sales facility, wherein the transmitting device (CP-S) and the receiving device (CTR-R) both perform wireless data transmissions including at least one of near field communication and Bluetooth data transmission; and wherein the optical image scanning device (SCN) performs optical data transmission including barcode scanning;

wherein the first equipment (CP) assigns a time stamp to the identifier generated that indicates a maximum validity period for the identifier (CD); and wherein the second equipment (CP) assigns a frequency stamp to the identifier generated (CD) that indicates a maximum number for repeat uses of the identifier (CD).

* * * * *